(12) United States Patent
Arbore

(10) Patent No.: US 6,354,439 B1
(45) Date of Patent: Mar. 12, 2002

(54) CEMENT TRUCK NOZZLE CLEANER

(76) Inventor: Cataldo S. Arbore, 371 Carlsam Dr., Rochester, NY (US) 14609

( * ) Notice: Subject to any disclaimer, the term of this patent is extended or adjusted under 35 U.S.C. 154(b) by 0 days.

(21) Appl. No.: 09/401,229

(22) Filed: Sep. 22, 1999

(51) Int. Cl.[7] .................................................. B07B 1/04
(52) U.S. Cl. ...................... 209/421; 209/420; 209/355; 209/353
(58) Field of Search ................................. 209/420, 421, 209/355, 353, 352, 235, 242, 241, 240

(56) References Cited

U.S. PATENT DOCUMENTS

| | | |
|---|---|---|
| 3,596,759 A | 8/1971 | King et al. |
| 3,886,063 A | 5/1975 | Friesz |
| 3,997,434 A | 12/1976 | Macauley, Jr. |
| 4,016,978 A | 4/1977 | Danna, Jr. |
| 4,127,478 A | 11/1978 | Miller |
| 4,192,745 A | 3/1980 | Hood |
| 4,285,808 A | 8/1981 | Horton |
| 4,792,234 A | 12/1988 | Doherty |
| 4,963,031 A | 10/1990 | Brown |
| 5,127,740 A | 7/1992 | DeBoer |
| 5,466,092 A | 11/1995 | Semenza et al. |
| 5,618,002 A * | 4/1997 | Cervelli et al. .............. 239/657 |
| 5,725,348 A * | 3/1998 | Drake ......................... 414/408 |
| 5,741,065 A * | 4/1998 | Bell et al. ..................... 366/54 |
| 6,155,277 A * | 12/2000 | Barry ....................... 134/104.4 |

* cited by examiner

Primary Examiner—Donald P. Walsh
Assistant Examiner—Jonathan R Miller
(74) Attorney, Agent, or Firm—Brian B. Shaw, Esq.; Stephen B. Salai, Esq.; Harter, Secrest & Emery LLP

(57) ABSTRACT

A device enabling the timely removal and subsequent recycling of residues remaining in a pouring chute through which the load of a cement from a mixing drum of a mobile delivery vehicle was discharged. A strainer on a movable arm attached to the vehicle is placed under the chute to receive an effluent which results from spraying the inside of the nozzle with water. Solid particulates are retained by the strainer and a slurry which emerges from the strainer is pumped into the mixing drum, allowing the separated materials to be recycled when the vehicle returns to its base.

20 Claims, 4 Drawing Sheets

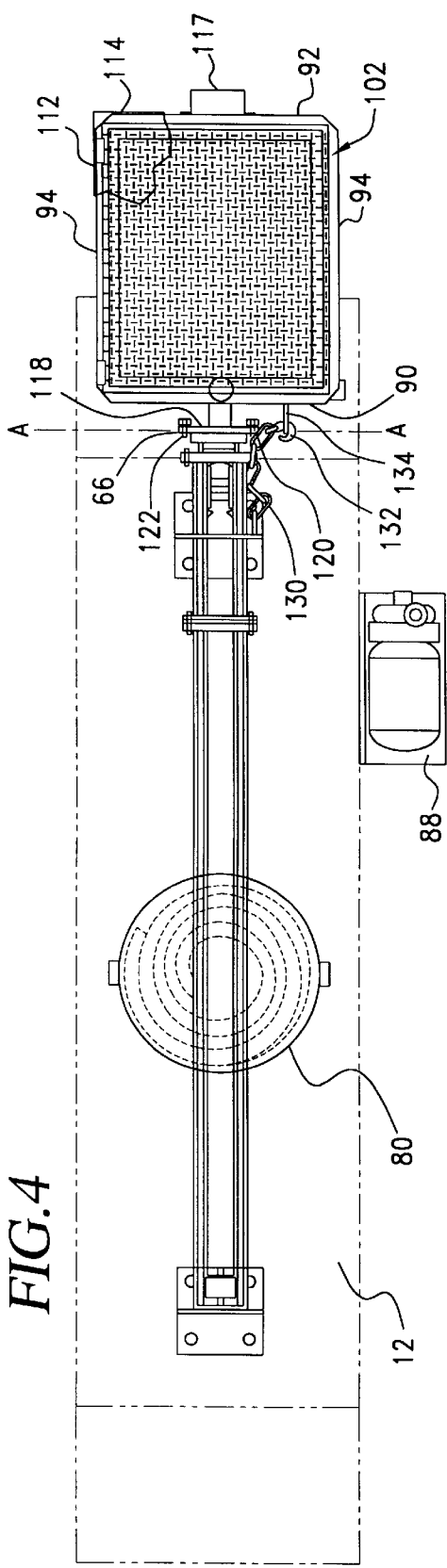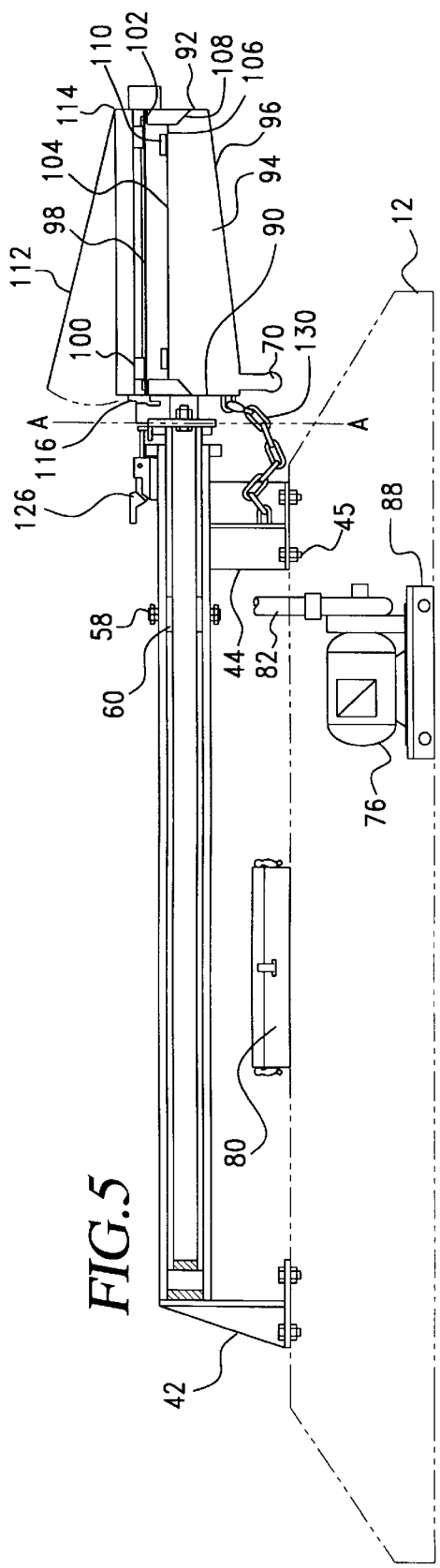

CEMENT TRUCK NOZZLE CLEANER

FIELD OF THE INVENTION

The present invention relates to a system for the timely flushing and recovery of residues from a pouring chute on a cement truck in order to prevent them from hardening in the chute and more particularly to a self-contained system that is transportable with the truck.

BACKGROUND OF THE INVENTION

Cement and concrete mixes are frequently delivered by a so-called "transit mixer". The transit mixer is a truck with a rotatable mixing drum, into which batch ingredients are loaded. The raw materials are mixed by rotating the drum as the truck proceeds to its intended destination, where the cement is poured as required. This procedure is well known in prior art.

A major issue in the construction industries is how best to clean and recycle residual materials out of the system. Residues, if not removed from the truck soon enough, harden and present the operator with an enormous cleaning problem. Also it is to the operator's advantage to handle residues in an environmentally benign manner, since this avoids both legal sanctions and the wastage of materials which have an economic value. The issues of removing and recycling residual material are the subject of prior art, as exemplified by U.S. Pat. Nos. 3,596,759, 3,886,063, 3,997,434, 4,016,978, 4,127,478, 4,285,808 and 5,127,740. Washing and material reclamation systems are described in U.S. Pat. No. 3,997,434 and 4,285,808; however, these deal with systems wherein the residues are washed directly out of the transit mixer into stationary handling equipment located at some base of operations. U.S. Pat. No. 5,127,740 describes a system wherein a chemical retardant is added to excess mixture to delay its hardening, and a chemical accelerant is subsequently added to restore the original hardening characteristics of the mixture when it is once again needed for use. U.S. Pat. No. 4,016,978 describes a mobile cleaning and separating system which is appended to the truck, and is intended to deal with excess material remaining in the mixing drum.

Normally the mixing drum is cleaned out after returning to its base, but the pouring chute, which directs the transfer of material from the mixing drum to its intended point of discharge, must be cleaned immediately after each use. The residue in the pouring nozzle has a high surface area relative to its volume, and therefore dries very rapidly. This inevitably accelerates its hardening. Currently available alternatives include flushing out the nozzle with water and allowing the products of flushing to be dumped at the site, which is environmentally undesirable, or collecting them in an improvised container.

SUMMARY OF THE INVENTION

It is the primary purpose of the present invention to provide a convenient portable system to allow the operator to flush out the pouring nozzle with water so that the washed out solids are retained in a strainer and the resulting slurry is directed into the mixer drum. The system is affixed to the truck and constructed so that the strainer can be retracted and stowed close against the truck when not in its operative position. When the truck returns to its depot, the drum is cleaned in the normal way at a cleaning station. and the contents of the strainer are merged with like residues from other sources to be recycled.

BRIEF DESCRIPTION OF THE DRAWINGS

FIG. 4 is an enlarged top plan view of the invention in a retracted mode.

FIG. 5 is a side elevational view of the invention in a retracted mode.

DETAILED DESCRIPTION OF THE PREFERRED EMBODIMENT

Even though the words "cement" and "concrete" are not strictly synonymous, for the purposes of this invention, the term "cement" will be understood as referring to either. The term cement includes these combinations of materials that when mixed with sufficient water will set.

Figure 1:
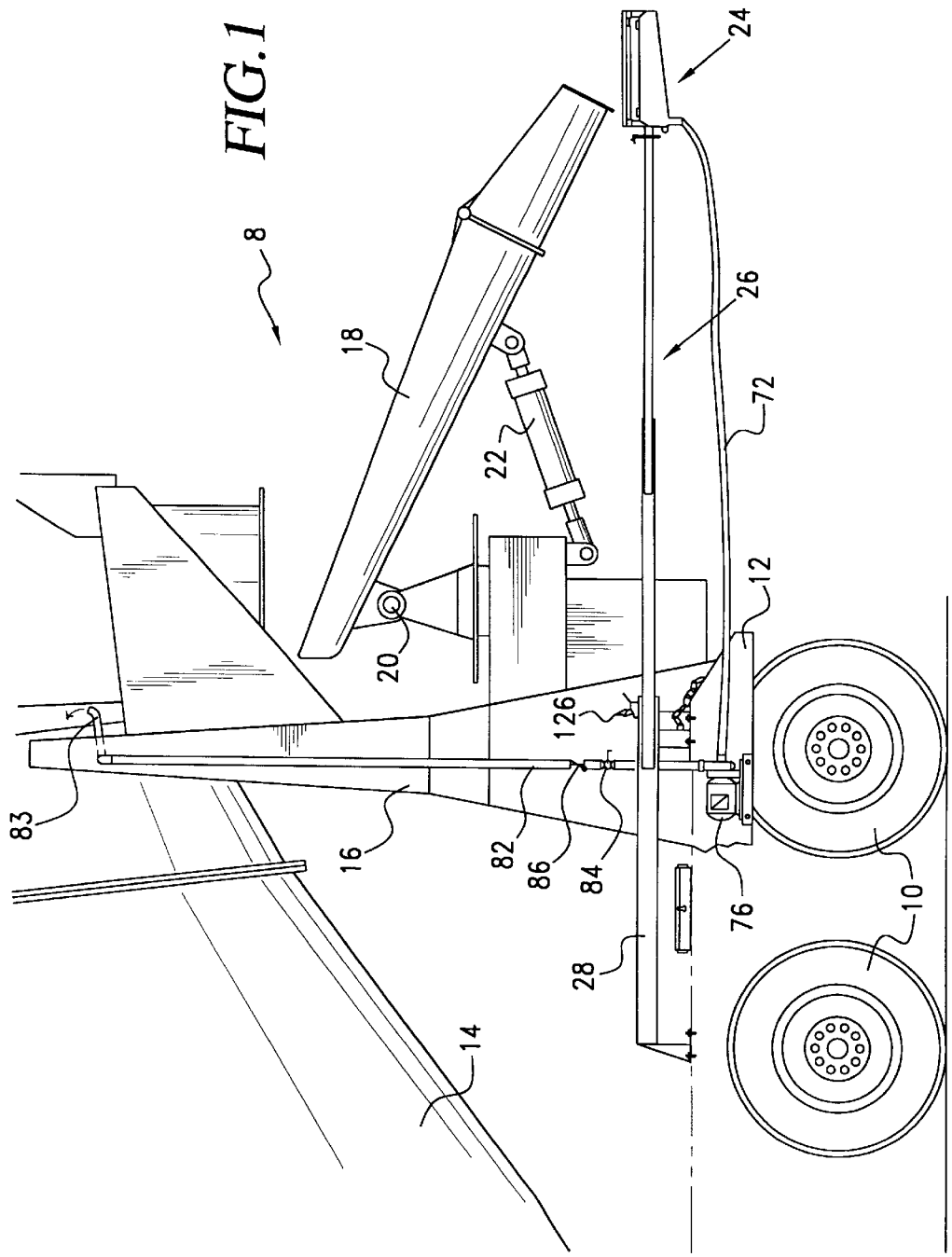
FIG. 1 is a side elevational view of a rear portion of a cement truck and the invention mounted thereon in an extended operative mode.

FIG. 1 is side view of the rear of a cement truck 8, showing rear wheels 10, a wheel guard 12, a mixing drum 14, a support member 16 and a cement pouring chute 18. The cement pouring chute is supported at a pivoted mount 20 and is operated by a pneumatic or hydraulic cylinder 22. It is not necessary to specify further components of the truck and mixer, except as they may become relevant to describing the invention.

Figure 2:
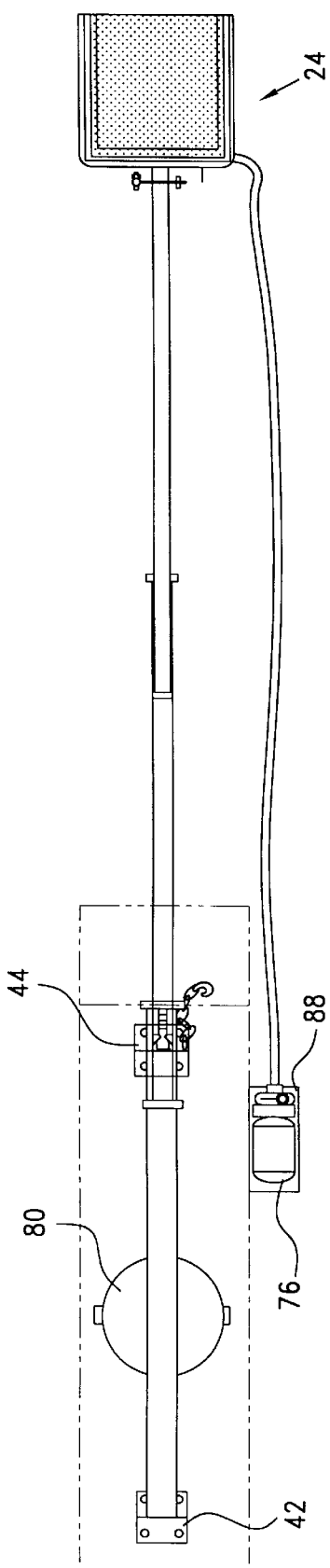
FIG. 2 is a top plan view of the invention in its extended mode.
Figure 3:
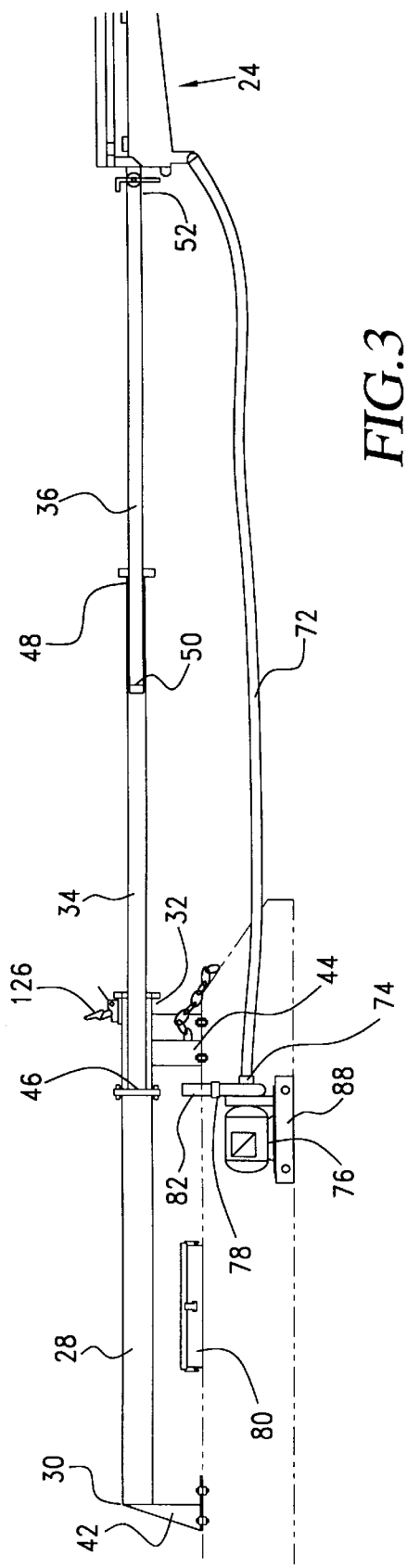
FIG. 3 is a side elevational view of the invention in its extended mode.

The invention comprises a strainer 24 mounted to the end of a telescopic arm 26, which has an extended position as shown in FIGS. 1–3 and a retracted position as shown in FIGS. 4 and 5. The arm comprises stationary member 28 with a front end 30 and a back end 32, an outer sliding member 34 which fits inside the stationary member 28, and an inner sliding member 36 which fits inside the outer sliding member 34. Preferably, the cross-sectional profiles of the sections permit telescoping of the sections. In one configuration, each member of the arm 26 has a square cross-section. The stationary member 28 is fixedly mounted at its front end 30 onto a first bracket 42 and some way in from its back end 32 onto a second bracket 44, both the brackets being affixed with bolts such as 45 to the top of the wheel guard 12.

Figure 6:
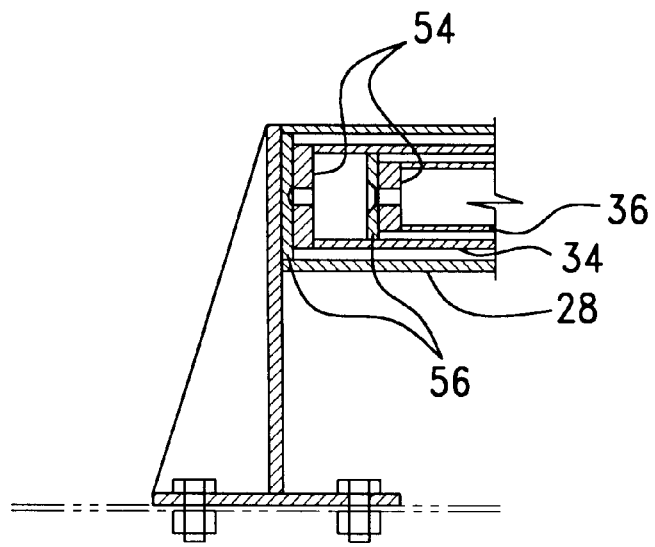
FIG. 6 is a cross-sectional view taken along the dashed circle of FIG. 5.

The outer sliding member 34 has an inner end 46 and an outer end 48. Similarly, the inner sliding member 36 has an inner end 50 and an outer end 52. As best shown in FIG. 6, each inner end 46 and 50 has a flat closure 54 which has an attachment point in the form of a threaded hole at its geometric center. To this attachment point is bolted a slide flange 56 whose perimeter conforms in size and shape to the inner dimensions of the next outer telescopic member, such that there is just sufficient clearance to provide for movement. The slide flange 56 is fabricated from a durable material providing low sliding friction with the surface it contacts, and is preferably fabricated from Teflon. To prevent the outer sliding member 34 from being pulled out too far out of the stationary member 28, the stationary member has a stop 58 located about one-quarter of its length from the back end 32. The outer sliding member 34 has an internal stop 60 for the inner sliding member 36. Both stops prevent the passage of the slide flanges 56.

Figure 7:
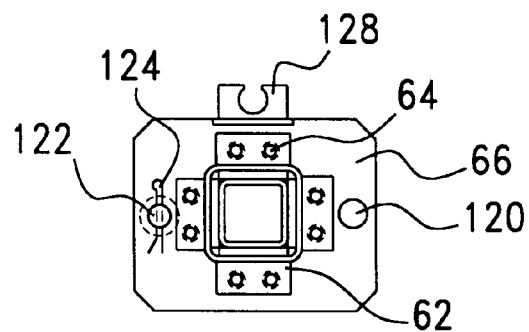
FIG. 7 is an end elevational view along plane AA in FIGS. 4 and 5.

At the outer end 52 of the inner sliding member 36 are four orthogonal isoplanar lugs such as 62, shown in a front view in FIG. 7, each lug having two holes for bolts such as 64. A first connecting plate 66, having holes which match those of the lugs, is affixed to the lugs with bolts 64, in a vertical plane and orthogonal to the centerline of the telescopic arm 26. In addition, the first connecting plate 66 has two symmetrically disposed fastening holes spaced horizontally apart so as to avoid possible interference with bolts 64.

The strainer 24 has an outlet port 70, to which is attached one end of a flexible hose 72. The other end of the hose is connected to an inlet 74 of a pump 76, the pump also having an outlet opening 78. Both ends of the hose are equipped with quick disconnect attachments which allow the hose to be removed and kept in a storage bin 80 when not in use. The outlet 78 of the pump is connected to the inlet end of a pipe 82 having also an outlet end, the pipe being rigidly affixed to the support member 16. At the outlet end of the pipe is a hose 83 directable into the mixing drum 14. Immediately downstream from the pump outlet 78, the pipe has a shutoff valve 84 and, slightly further downstream, a check valve 86. The pump 76 is mounted with a right-angled bracket 88 to the side of the wheel guard 12.

Referring again to FIG. 5, the strainer 24, includes metal housing, rectangular or square in plan, having a front-facing wall 90, a rear-facing wall 92, two side-facing walls 94 and a bottom 96. The bottom 96 slopes downward towards the front 90. Near the lowest edge of the bottom is affixed the aforementioned outlet 70. Enclosed by the sides of the strainer, orthogonal to all of them and slightly below their uppermost edges is a first screen 98, comprising a metal mesh bounded by strengthening members. The first screen is a relatively coarse primary screen and has an open and a closed position, and is fastened to a side-facing wall 94 of the strainer with hinges 100. It is supported flat in its closed position by a flange 102 which is affixed along the entire inside perimeter of the strainer walls. When viewed from the top, the first screen has dimensions slightly smaller than the inside dimensions of the strainer, which allow its easy movement between the open and closed position.

Some distance below the first screen, but well above the lowest edge of the rear-facing wall 92, is a second relatively fine, secondary screen 104 which is constructed similarly to the first screen 98 but has a finer mesh. When viewed from above, it has smaller dimensions than the first screen, and is supported in like manner by an inner flange 106. This flange is affixed to the entire inside perimeter of the strainer through an intermediate spacer 108. The second screen also has an open and a closed position, and is fastened to the spacer with hinges 110. The first and second screens are oriented alike with respect to their hinged edges. The dimensions of the second screen and those of the spacer are such as to allow the easy movement of said second screen between its open and closed positions. The clearance between the two screens allows both of them to be simultaneously maintained in their open positions.

Preferably, the volume of the housing below the secondary screen is sufficient to provide fluid flow through the screen. That is, the volume of the housing below the secondary screen is selected to ensure a liquid level in the housing below the secondary screen upon a flow rate of cleansing liquid and entrained residue from the chute 18.

The strainer 24 also comprises a cover 112, which is attached to the top edge of the rear-facing wall 92 with a piano type hinge 114 and can be kept closed with a clasp mechanism 116. The strainer further comprises a hand grip 117 affixed to the exterior of the rear-facing wall 92.

A second connecting plate 118 is rigidly attached to the front-facing wall 90 of the strainer, with some clearance between them, such that the planes of plate and the front-facing wall are parallel. The second connecting plate 118 matches the first connecting plate 66 in dimensions and also has fastening holes which match and align with those on the first connecting plate 66. The connecting plates are joined together with a pivot-bolt 120 through one pair of aligned fastening holes and with a removable stud 122 through the other aligned fastening holes. The stud 122 is held in place by a cotter pin 124 unless its removal is desired. Removal of the stud 122 allows the strainer 24 to pivot sideways, so that with the cover 112 opened both screens 98 and 104 may hinge open. The pivot-bolt 120 is located such that when the strainer 24 tilts, the screens 98 and 104 have their hinges 100 and 110 along their respective upper edges.

The telescopic arm 26 is in its transport position when retracted, and in its operable position when extended. In its transport position, the arm is immobilized by securing the inner sliding member 36 to the stationary member 28 with a safety latch 126 which engages with an opening in a catch 128. The system is additionally secured by a short safety chain 130, one end of which is permanently attached to the second bracket 44 and the other of which is removably fastened to the outside of the strainer with a hook 132 and an eye bracket 134.

Operation of the system begins with the operator unhooking the safety chain 130 and unfastening the safety latch 126. The telescopic arm is now free to move and the strainer is pulled manually to its operable position beneath the pouring chute 18. The flexible hose 72 is connected to the strainer outlet 70 and the pump inlet 74. The strainer cover 112 is opened and water flushed from a hose into the pouring chute 18, the water originating either from a storage reservoir on the vehicle 8 or from an external source. The water entrains any solid particles adhering to the chute to form an effluent which flow down into the strainer. The first screen 98 retains the fraction comprising the largest particles and passes the remainder of the effluent. The second screen 104, being of finer mesh, retains a further fraction of particles and passes the remaining effluent which comprises a slurry of the smallest particles in water. This effluent collects in the lowest part of the strainer 24 and flows into the flexible hose 72. The shutoff valve 84 is opened and the pump activated. The slurry flows out of the strainer and through the flexible hose, the pump and the pipe 82, from the outlet end of which it is directed through the hose 83 into the mixing drum 14. When the pump is shut off, residual slurry in the tube is prevented by the check valve 86 from draining back into the lower parts of the system.

Once the filtration is complete, the strainer cover 112 is closed, the flexible hose 72 disconnected and returned to the storage bin 80, and the telescopic arm 26 returned to its retracted position where it is secured. If no further cement remains to be delivered at another site, the cement truck 8 is driven to a cleaning station at its home base.

When the truck returns to its cleaning station, the telescopic arm 26 is released from its transport position and extended until the strainer is directly above a prescribed collecting point. The strainer cover 112 is opened, the cotter pin 124 is removed to permit removal of the stud 122, and the strainer 24 tilts above the pivot-bolt 120. The tilt is manually increased beyond 90, allowing the screens 98 and 110 to swing freely about the hinges 100 and 110 which are along the uppermost edges of the respective screens. The retained solids drop into the collection area, where they merge for recycling with like material from other vehicles. Any remaining residues are sprayed off and the strainer and telescopic arm returned to their transport position until the next use.

The slurry that was delivered into the mixing drum 14, having merged with residues already contained therein, is treated as part of those residues in the customary manner.

The use of two screens in preference to a single screen assists the filtration process. If a single fine-mesh screen were used it would tend to clog and slow the drainage of the fraction passing through it. On the other hand, a single coarse-mesh screen would allow the passage of larger particles which could cause blockages downstream and also damage the pump.

The present invention comprises an assembly which is a combination of specially fabricated constituents and standard items. Bearing in mind the corrosive conditions under which the strainer would operate, a preferred embodiment of the invention would comprise a strainer fabricated from type 316 stainless steel. The preferred embodiment of the invention would also comprise a telescopic arm fabricated from tube steel.

It is also contemplated that the strainer may be removably connected to the chute to intersect the flow path of effluent from the chute. For example, the strainer may be hooked or releasably fastened to the chute such that material passes through the strainer and the strainer retains the entrained material. Upon completion of the cleaning of the chute, the strainer may be released from the chute and releasably attached to a portion of the truck or the frame. It is also contemplated that the strainer may be fixably attached to the truck and the chute movable between a discharge position for passing the cement from the vehicle to a cleaning position wherein the chute discharges through the strainer.

While I have described the invention In connection with preferred embodiments, I am aware that numerous and extensive departures may be made therein without however departing from the spirit of my invention and the scope of the appended claims.

What is claimed:

1. A device for cleaning and recycling residues from the material delivery chute of a mixer on a motorized vehicle, comprising:
   (a) an extendible arm connected to the vehicle, the arm being movable between a retracted position and an extended position;
   (b) a strainer having an inlet and an outlet, and connected to the arm to be moveable from a transport position to an operating position, the strainer operably aligned with the delivery chute in the operating position;
   (c) a reservoir connected to the vehicle; and
   (d) a fluid transfer channel extending between the strainer outlet and the reservoir.

2. A device for cleaning and recycling residues from the material delivery chute of a mixer on a motorized vehicle, comprising:
   (a) an extendible arm connected to the vehicle, movable between a retracted position and an extended position;
   (b) a strainer connected to the arm to be moveable between a transport position and an operating position to be operably aligned with the delivery chute, the strainer having an inlet and an outlet;
   (c) a reservoir connected to the vehicle;
   (d) a mechanism connected to the arm and the strainer for tilting the strainer from a receiving position to an ejecting position; and
   (e) a fluid transfer channel extending between the strainer outlet and the reservoir.

3. A device for cleaning and recycling residues from the material delivery chute of a mixer on a vehicle, comprising:
   (a) an extendible arm connected to the vehicle, the arm including a plurality of telescopically sliding members movable from a retracted position to an extended position;
   (b) a strainer connected to the arm to be moveable from a transport position to an operating position aligned with the delivery chute, the strainer having an inlet and an outlet;
   (c) a liquid reservoir connected to the vehicle;
   (d) a swivel connected between the vehicle and the arm for tilting the strainer between a receiving position and an ejecting position; and
   (e) a fluid transfer channel extending between the strainer outlet and the reservoir.

4. The device of claims 1, 2 and 3, wherein the strainer has a perimeter wall, a sloping bottom, a first screen enclosed by the perimeter wall near the top of said wall, a finer second screen enclosed below the first screen, the strainer having spaces between the first and second screen, and between the second screen and the shallowest part of the sloping bottom, and having a fluid drainage fitment at the deepest part of the sloping bottom.

5. The device of claim 4, wherein the first screen has mesh openings of $7/32$" (5.5 mm) and the second screen has openings of $1/8$" (3 mm).

6. The device of claim 4, wherein the perimeter wall comprises a front-facing wall, a rear-facing wall and two side-facing walls.

7. The device of claim 6, wherein each screen has an open and a closed position.

8. The device of claim 7, wherein the first screen is hingedly attached to one of the aforementioned side-facing walls and the second screen, having smaller area than the first screen, is hingedly attached through an intermediate spacer to the same side-facing wall as the first screen.

9. The device of claim 8, wherein the first screen in its closed position rests flat on a supporting flange attached to the inner perimeter of the strainer, and the second screen in its closed position.

10. The device of claim 9, wherein is hingedly attached an openable cover to an upper edge of the strainer.

11. The device of claims 1, 2 or 3, wherein the fluid transfer channel comprises:

a pump with an inlet fitment and an outlet fitment, the pump being fixedly attached to the aforementioned motorized vehicle;

a flexible hose with a first end and a second end, the first end being removably attached to the drainage fitment of the strainer and the second end being removably attached to the inlet fitment of the pump;

a discharge tube with two ends, the first end being fixedly connected with the outlet fitment of the pump, and the second end having an outlet to deposit fluid in the fluid receiver;

the discharge tube having a shutoff valve near its first end, and a check valve between the shutoff valve and the second end.

12. The device of claim 11, further comprising a storage bin.

13. The device of claims 1, 2 or 3, wherein the fluid receiver is a mixing drum.

14. The device of claims 1, 2 or 3, wherein the strainer is fabricated from stainless steel.

15. The device of claim 3, with the extendible arm having members of square cross-section.

16. The device of claim 15, with the extendible arm having members fabricated from tube.

17. The device of claims 2 or 3, wherein the mechanism for tilting the strainer comprises a first attachment fitment and a second attachment fitment, the attachment fitments being spaced horizontally apart, such that the first attachment fitment is a pivot-bolt and the second attachment fitment is a removable stud, the stud having a removable cotter pin.

18. A process for cleaning and recycling particulate matter from a material delivery chute of a mixer drum on a vehicle, which comprises:

(a) moving an arm from a transport position to an operable position to locate a strainer beneath the delivery chute;

(b) passing relatively clean water through the chute into the strainer to entrain the particulate matter from the chute, thus forming an effluent;

(c) collecting the effluent in the strainer to separate the particulate matter and collect a slurry; and (d) transferring the slurry into the mixer drum.

19. The process of claim 18, which further comprises:

(a) screening out larger particles with a coarse first screen;

(b) screening out smaller particles with a finer second screen;

(c) retracting the arm to its transport position and returning the vehicle to a cleaning station at its home base;

(d) extending the arm to locate the strainer over a solids collection point;

(e) opening and tilting the strainer to dump its contents by gravity at the collection point; and (f) washing out the strainer.

20. A screening apparatus for a truck having a cement retaining chamber and an outlet chute for passing cement having particulate matter from the chamber, comprising: a strainer connected to the truck, the strainer locatable at a screening position to receive an effluent slurry from the chute, and having openings sized to pass fluid from the effluent slurry while retaining the particulate matter.

* * * * *